(12) United States Patent
Remy (10) Patent No.: US 8,645,271 B2
(45) Date of Patent: Feb. 4, 2014

(54) SECURE TELEMATICS PAYMENT METHOD (76) Inventor: Cédric Remy, Vaucresson (FR)

(*) Notice: Subject to any disclaimer, the term of this patent is extended or adjusted under 35 U.S.C. 154(b) by 1059 days.

(21) Appl. No.: 10/415,061

(22) PCT Filed: Oct. 25, 2001

(86) PCT No.: PCT/FR01/03322
§ 371 (c)(1),
(2), (4) Date: Apr. 25, 2003

(87) PCT Pub. No.: WO02/35486
PCT Pub. Date: May 2, 2002

(65) Prior Publication Data
US 2004/0054632 A1    Mar. 18, 2004

(30) Foreign Application Priority Data
Oct. 25, 2000    (FR) .................................. 00 13708

(51) Int. Cl.
*G06Q 40/00*    (2012.01)

(52) U.S. Cl.
USPC .................................. 705/40; 705/35; 705/39

(58) Field of Classification Search
USPC .............................. 705/35, 39, 40, 41, 42, 44
See application file for complete search history.

(56) References Cited

U.S. PATENT DOCUMENTS

| 7,080,046 B1* | 7/2006 | Rezvani et al. ................. 705/64 |
| 7,729,986 B1* | 6/2010 | Hoffman et al. ................ 705/41 |
| 7,756,748 B2* | 7/2010 | Shaked et al. ................ 705/26.1 |
| 2002/0013815 A1* | 1/2002 | Obradovich et al. ......... 709/204 |
| 2002/0035539 A1* | 3/2002 | O'Connell ..................... 705/39 |

* cited by examiner

*Primary Examiner* — Lalita M Hamilton
(74) *Attorney, Agent, or Firm* — William H. Holt (57) ABSTRACT

A method for controlling secure telemetric payments using an open network. A plurality of servers are utilized: (1) first servers linking merchants with financial institutions, (2) second servers operated by the financial institutions for performing financial transactions for a group of clients with whom consumers perform commercial and financial transactions, and (3) third servers used by service operators for performing validation operations for the transactions. Separate telephone networks are used for connecting the second servers to the third servers, and for linking the third servers to the consumers.

9 Claims, 4 Drawing Sheets

SECURE TELEMATICS PAYMENT METHOD

BACKGROUND OF THE INVENTION

The use of telematics for the exchanges of goods and services between economic people tends to become widespread, and becomes the basis of a new economy because of the information backbone networks, and especially of the "Internet" network.

It is easy for anyone to reach, according to a shared protocol (HTTP), the information stored on all the servers spread over the world, designed according to a same standard (WWW), and linked together by a standard network (TCP/IP), with a client workstation equipped with an appropriate software (Internet browser).

With the Internet, any commercial company has the means to open a virtual shop that an Internet buyer can visit from anywhere on earth.

The easy access, and the "open" network, in the sense that the connections are not limited either by the number or by the characteristics of the connected client workstations, have been the key to the success of the "Internet".

But this is a disadvantage when the confidentiality of data exchanged in the network or archived on the servers must be kept.

This is the case when the Internet buyer, after having ordered, has to pay his purchases.

The main solution suggested is to pay by credit card: the buyer has to enter online, in a form, the type and the number of the credit card, its expiry date, and the name of the holder.

If it is sent without precautions, this information could be intercepted by a third party and used to make other purchases. So the financial transaction is usually made with a secured protocol (HTTPS) which substitutes itself for the current standard (HTTP) and uses data encryption processes.

However, even if these processes require very complex mathematical techniques, insofar as the encrypted data can be intercepted, they risk to be decoded, in particular by malicious people acting in simultaneous and concerted manners.

The American patent U.S. Pat. No. 6,012,144 in the name of T. Pickett, published on Jan. 4, 2000, describes a solution to the problem of the confidentiality of the credit card numbers that circulate on the Internet and are stored on servers connected to this network, by transmitting the first part of the coded number on the TCP/IP network, the second part on the telephone network, and by archiving both parts in two different data bases. The SGBD is connected to the HTTP server with a dedicated data link which is not an IP link, and which therefore acts like a firewall.

In addition to the problem created by the possible interception of sensitive data, it is important that the proof of the buyer agreement should be given during the procedure of the payment with a credit card, and by that make sure of the holder's identity.

The system described in the patent U.S. Pat. No. 6,012,144 uses the telephone network to call, with a vocal server, the person who makes the transaction, in order to verify his identity automatically. The buyer has to dial a personal identification number (PIN), then he is guided by the vocal server to confirm or cancel his order by pressing the appropriate keys.

The method and the system described in the patent U.S. Pat. No. 6,012,144 solve the problem of the security of the transactions on the Internet in an original way, but the practical and economical advantages of the payment by credit card are very limited by the complexity of the system.

Another system of secured payments on the Internet is based on the existence of an intermediary who secures the payments by holding the sensitive data of the buyers and sellers so that they should not circulate on the Internet.

Such a system is described in the international patent WO99/66436, in the name of the company Protx, published on Dec. 23, 1999.

The sellers, the buyers, the financial establishments and an intermediary operator are all connected to the Internet. The data bases which store separately the information dedicated to the buyers and to the sellers are linked together by a private network. The sellers and buyers accede to the operator's private network with gates connected to the Internet, and give their transaction orders separately. The exchange and the gathering of confidential information are achieved with a private network, and therefore in a secured way, without any party to know all the details concerning the other. A gate as well links the banks directly to the operator's network for the financial transaction processing.

This kind of organization enables a secured relationship between sellers and buyers, but a closed one, and introduces an opposite logic to the Internet one which is fundamentally an open network: any web buyer can make purchases on any commercial website without any pre-established constraint.

The process to make secured transactions on the Internet, which is described in the American patent U.S. Pat. No. 6,088,683, in the name of R. Jalili, published on Jul. 11, 2000, avoids the problem of the obligation of the registering of the seller as well as the buyers by an operator using a system close to the one described in the patent U.S. Pat. No. 6,012,144, while simplifying it to make it more attractive.

The information about the buyer's credit card never circulates on the Internet and, therefore, are safe from a fraudulent misappropriation. As in the system explained in the patent U.S. Pat. No. 6,012,144, a process of call back of a pre-recorded number enables to authenticate the buyer.

If some sensitive financial information is not transmitted on the open network, it still needs to be archived on the service operator's website. This can be a risk, in spite of the firewall and the other security systems which could be installed by the operator.

It emerges from the state of the technology such as described above that payment systems by secured telematics are known, but that today no simple and economical system with all the secured guaranties exists yet.

SUMMARY OF THE INVENTION

The present invention provides for secure telematic payment by avoiding the disadvantages of the previous secured procedures.

It has precisely for subject a procedure like those controlling:

a) an open network using the TCP/IP protocol, preferably the "Internet" network, structured with a "client/server" architecture, and linking together a first group of servers, with which merchants perform commercial transactions, a second group of servers, with which financial institutions perform financial transactions, a group of clients, with which consumers perform commercial and financial transactions, and a third group of servers with which service operators perform validation operations on these transactions, b) a first telephone network linking the first group of servers to the servers in the third group, c) a closed network using a "point to point" link and connecting the second group of servers to the servers of the third group, d) a second telephone network linking the third group of servers to the consumers,
and including the following steps:
a) a preliminary step during which the service operator records information about customer names, including at least a call number of the second telephone network, as well as financial information concerning them, and sends them their identification data using totally secure methods,
b) a first step during which a buyer uses one of the clients to access a seller's site hosted using one of the servers of the first group and places an order for merchandise,
c) a second step during which the buyer sends the identification data concerning him on the open network using the corresponding client,
d) a third step during which the seller sets up a link with the operator using the open network and sends him an identification string, including the company name and bank references of the seller as well as the identification data of the buyer, and the references of the order,
e) a fourth step during which the operator sets up a link using the second telephone network and sends an authentication request for the buyer to the call number,
f) a fifth step during which the operator sets up a link with the seller using the first telephone network and sends the payment confirmation of the order after verification of the financial information, and
g) a sixth step during which the operator sets up a link with the second group of servers, using the closed network, and sends a transaction order resulting in the payment to the seller by the buyer.

The essential following characteristics of the procedure for secure telematic payment described above are:
a) the financial information includes the bank account number of each of the consumers,
b) the identification data includes:
   a bank address code including a first country identification field and a second bank identification field for each of the consumers,
   an identification number for the electronic account attached to the bank account number, and
   an identification code for each of the consumers,
c) this second step comprises an initial phase, during which the buyer sends to the seller the three identification data items, and a final phase following the third step during which the buyer sends the same three identification data items to the operator,
d) the second telephone network is a mobile telephone network and the authentication request is an SMS message containing the identification string of the seller, the references of the order and the indication of an action to be performed by the buyer on the keys of his mobile telephone, and
e) the verification includes matching the bank address code, of the identification number and of the bank account number.

The additional characteristics of the procedure according to the invention are:
a) the preliminary step comprises the periodic downloading by the first group of servers using the open network of correspondence tables between the address codes and the paths on the open network (URL) of Hypertext Markup Language (HTML) pages with credit transfer requests,
b) the third step comprises a first intermediate phase during which the seller sends over the open network the identification string to the buyer, the path corresponding to the address code of the buyer determined using the tables, the references and the three identification data items, a second intermediate phase during which the buyer accesses the corresponding page among the pages using the open network, and a third phase or final phase during which, besides the three identification data items, the buyer also sends to the operator, using the page, the identification string of the seller and the references.

It must be noticed, in the procedure for secure telematic payment according to the invention, the identification string of the seller includes at least one telephone number of the first telephone network, and his complete bank identification.

Attractively, the address codes and the identification numbers are saved on the client workstations of the consumers.

Preferably, the action to be performed by the buyer to identify himself is to type the SIM code of his mobile telephone.

We will get profit the fourth step of the procedure comprises a preliminary phase during which the buyer sets up a link with the operator in the case where the buyer was not connected to the second telephone network, and receives a list including at least the authentication request.

The credit transfer request pages are preferably archived on the third group of servers.

According to the invention, the additional following characteristics of the procedure for secure telematic payment are attractive:
a) each of the servers in the first group have at least one Hypertext Markup Language (HTML) page including:
   a first form for entering the address code including a first drop-down list offering the buyer the choice of a country and a second drop-down list offering a choice of banks,
   a second form for entering the aforementioned identification number and the identification code,
   a first script compliant with the CGI software standard whose execution is triggered by the confirmation of the order and produces a search in the correspondence table for the address code and the reading of the corresponding path, the reading of the data, comprising the identification string of the seller, the creation of the references of the order, as well as the creation and transfer to the buyer of a data frame including the path, the identification string, the references, and the three identification data items of the buyer,
   a second script compliant with the CGI software standard whose execution is triggered by the reception of the data frame including the path, the identification string of the seller, the references and the three identification data items of the buyer, sent by the seller, and produces the redirection of the buyer's browser to the path, the display on the screen of the client of the buyer of the credit transfer request corresponding to the path, as well as the loading in the credit transfer request of the identification string of the seller, of the order references, and of the three identification data items, and
b) each of the servers of the first group have at least one file containing the data comprising the identification string of the corresponding seller.

A great technical benefit is:
a) the credit transfer requests include a save button and a third script compliant with the CGI software standard whose execution is triggered by the save button and produces the transfer of the credit transfer request data to the operator,
b) each of the servers of the third group have a fourth script compliant with the CGI software standard whose execution is triggered by the receipt of the credit transfer request data, and produces the saving and analysis of the credit transfer request data, as well as the triggering of the fourth step.

The advantages of these additional characteristics are reinforced if, preferably, the page with the data entry form also includes a fifth script compliant with the CGI software standard whose execution is triggered by the opening of the HTML credit transfer request page and produces the search for, reading and loading of the three identification data items of the buyer in the data entry form, in the case where the aforementioned three identification data items have been saved by the buyer on his client workstation.

DETAILED DESCRIPTION OF THE INVENTION

Figure 1:
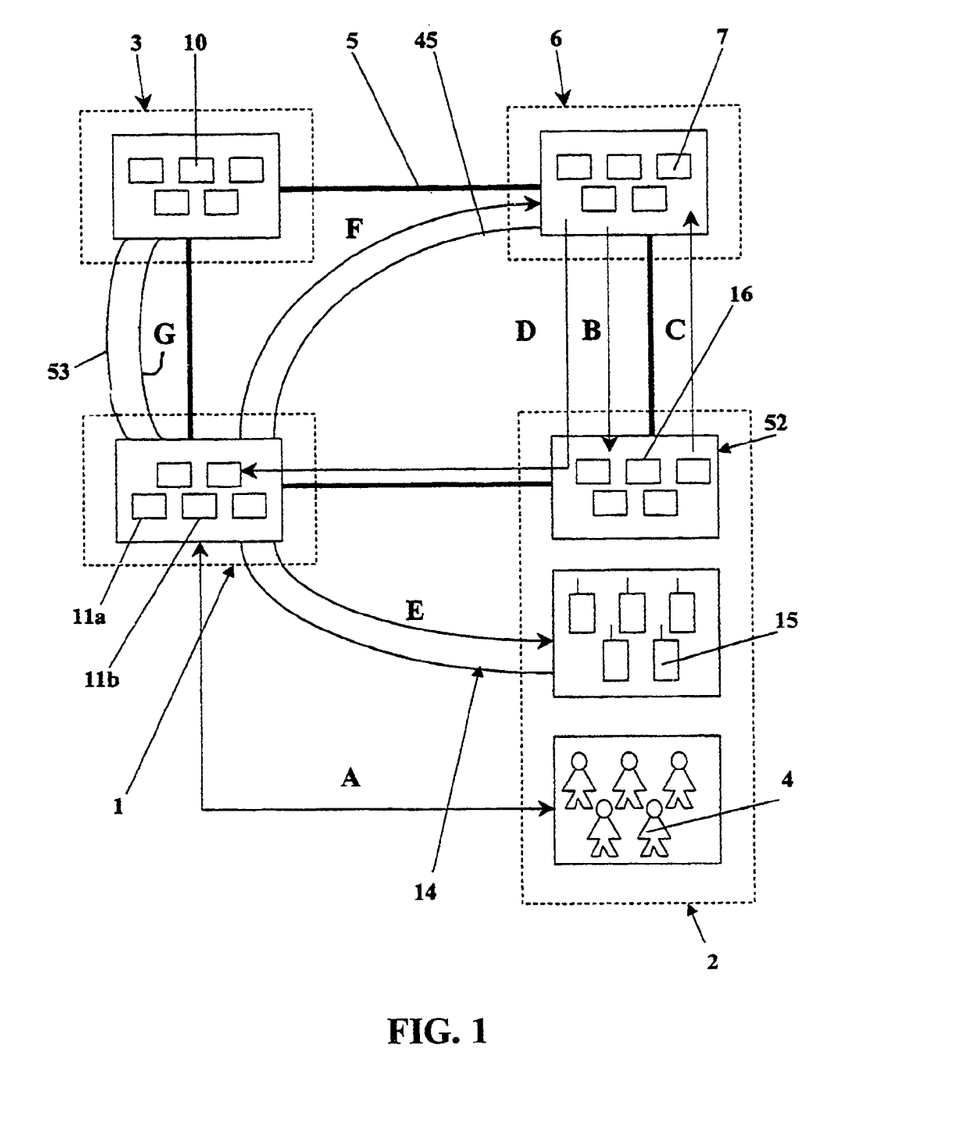
FIG. 1 shows the essential elements and the main steps of procedure for secure telematic payment according to the invention.

The references to FIG. 1 will help explain the invention.

This system enables a service operator (1) to perform directly on the buyer's bank accounts (2), held in different banks (3), transfer requests confirmed by the buyers (4) to pay purchases on the Internet (5), and then to notify the sellers (6) of the payments before the achievement of the transfers.

To place a purchase on a seller's (6) website (7), the buyer (4) has to follow an order creation scenario including the step of selecting a payment method. The buyer (4) who chooses to pay as the present invention advocates it selects (C) on an appropriate page of the seller's (6) website (7) the address code (9) of his bank (10) among the whole address codes (9) of banks (3) by countries offering this new payment solution. To this address code (9), the seller's website (7) sets up a link with the URL address (Uniform Resource Location) identifying, on the service operator's (1) server (11) of the buyer's (4) bank (10), the page of the transfer request (12) used for the purchase payment on the Internet. That is precisely the confirmation of the order by the buyer (4) which triggers the call (D) of this page (12) from the address code (9) entered in the order and so which automatically displays the transfer request (12).

As soon as a purchase order recorded on the seller's (6) web site (7) is confirmed by the buyer (4), the server (11a) of the service operator (1) of the buyer's (4) bank (10) displays a transfer request (12) and an indication of action (for example, a single action such as clicking on a mouse key) that the buyer has to perform to save (47) or on the contrary to cancel the transfer request. According to the buyer's choice (2), the display of the transfer request (12) is optional if no control interactive message is necessary. In that case, the record is made by default. To be performed on the buyer's (4) bank account, a transfer request must have the seller's bank address (6), or payee's, and the one of the buyer (4) or payer, as well as the information of the order. At the creation of the transfer request, the seller's bank account (6) (it is composed of the country code, the SWIFT code, the routing code, the account number and the account key in order to be able to compose the bank account to be credited), the complete buyer's bank account and his identifying code as well as the information recapitulating the order are transmitted as parameters from the seller's website (7) to the server (11a) of the service operator (1) of the buyer's (4) bank (10). When the transfer request (12) is saved on the Internet (5) by the buyer (4), the server (11a) receives and files a transfer to confirm, which will then have to be confirmed by the buyer (4).

The transfer to confirm, that the server (11a) of the service operator (1) of the buyer's (4) bank (10) receives and files when the buyer (4) saves the transfer request, is transmitted on the Internet (5). As the Internet (5) is an open network, the information which circulates on it can be intercepted. Consequently, the record of the transfer request by the buyer does not constitute a payment action strictly speaking but only the record of a payment action request. To constitute the secure payment action, the transfer request received and filed by the server (11a) of the service operator (1) of the buyer's (4) bank (10) is technically out of the Internet (5) environment, then is confirmed by the buyer (4) through a network (14) other than the Internet (5), and for example by the telecommunication network or by the cable one. More precisely, the confirmation request (E) necessary to pay the seller (6) by transfer is made by mobile phone (15). When the confirmation request (E) is confirmed, the telecommunication server (11b) of the service operator (1) of the buyer's (4) bank (10) receives and files a confirmed transfer. The confirmed transfer assures the buyer (4) of the secure payment action of a purchase on the Internet (5). The transfer is then allowed to be performed on the buyer's account (4) by the service operator (1) of his bank to pay the seller (6).

For the payee, the processing of a transfer by the service operator (1) or by a financial institution (3) is not an immediate credit of his account. It is indeed well-known that, as the banks (3) daily perform an interbank matching of balances, one or several days are nevertheless necessary so that the transfer payee's account be credited. Moreover, for the seller (6) to be advised of the credit to his account, his bank (3) has to transmit credit advices or bank statements. Consequently, the delivery of a good (or the downloading of a numeric good or a service) corresponding to a purchase on the Internet (5) should be delayed for the period of treatment of the transfer by the bank network. Such a system is against the rapidity of the Internet (5). To offset this asynchronism in the payment flow, the service operator (1) of the buyer's (4) bank (10) sends a payment notification (F) to the seller (6) as soon as the transfer is confirmed by the buyer (4). This notification (F) assures the seller (6) of a late credit of his bank account corresponding to a purchase on the Internet (5) and enables him this way to end the order (B) payment cycle. The notification (F) which is performed as soon as the transfer is confirmed by the buyer (4), enables an interactive payment cycle and, so, a fast release of deliveries or immediate downloads of numeric goods or services.

FIG. 1 represents the complete key components and the flow of information between them to perform a secure payment on the Internet (5) by a transfer request confirmed by the buyer (4) and then performed on his bank account.

Figure 2:
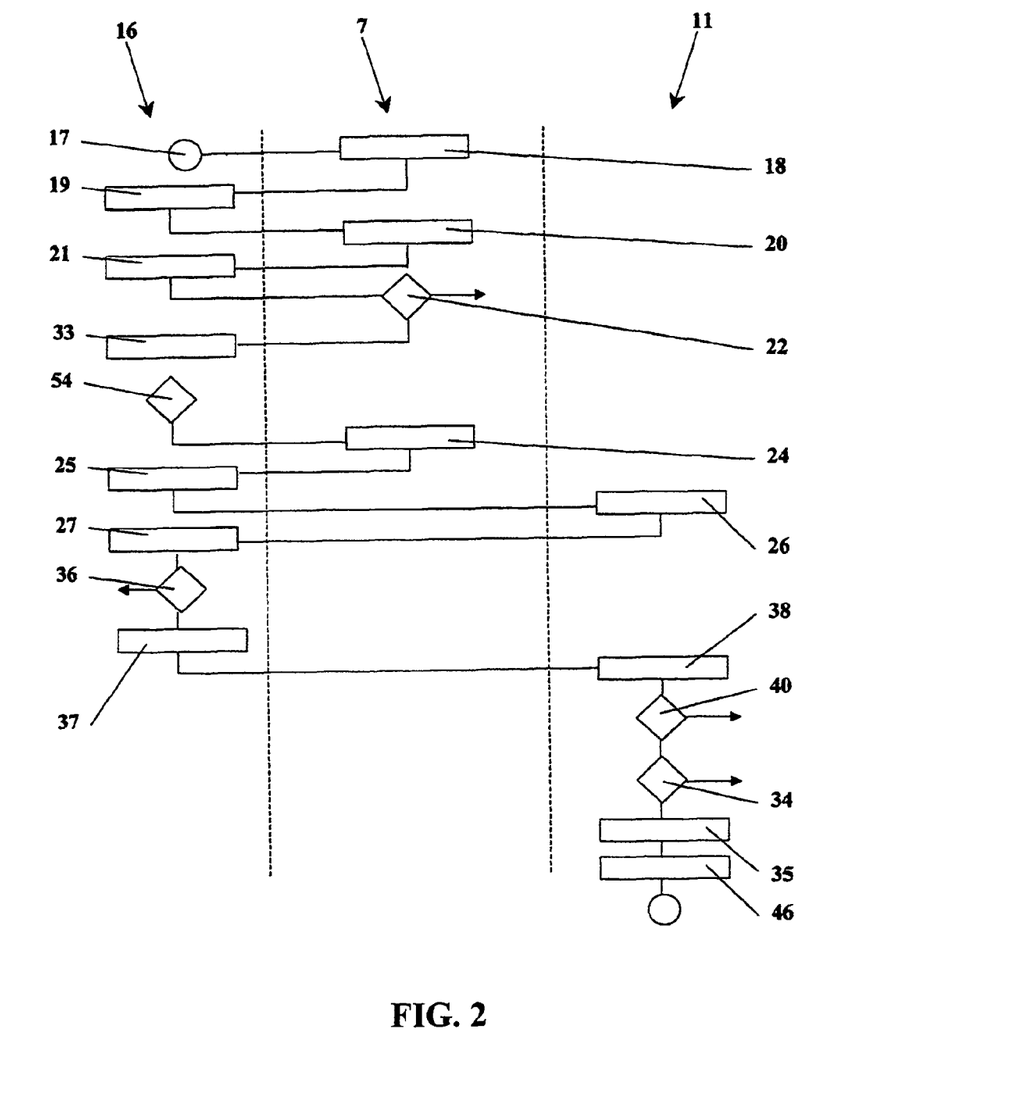
FIG. 2 indicates in details the linking of the steps, phases and events which characterize the procedure according to the invention.

The additional references to FIG. 2 will help explain the details of the procedure of payment according to the invention.

The buyer (4), from his personal computer (16) equipped with a modem, accesses (17) a website (7) to perform purchases (18). The buyer places orders (19) following a pre-established format (20) on the site (7) in order to make the purchases possible. The format of the purchases forces the buyer to go through the steps of the item selection, for example, of the delivery and bill address entering, of the delivery method specification, of the payment method selection (21), of the order confirmation and of the order confirmation notification. Only the step of the selection (21) of the payment method among the one necessary for the creation of the order concerns the present invention. The seller has to suggest this present invention as a payment method. The seller then suggests to the buyer the option to pay either in accordance with the protocol advocated by this present invention, or by credit card, or by check.

When the buyer chooses (22) to pay his orders by the present invention, he selects on the HTML page of payment method selection his bank address code, and he enters his eAccount (31) and his identification. To this bank address code corresponds the URL address identifying on the server of the service operator (1) of his bank (10) the page of transfer request used for the purchase payment on the Internet (24). The selection of bank address codes by the buyers on the seller's websites allows the present invention to be performed by different banks offering this payment method or by an operator performing accounts in different banks. So the present invention enables then the buyers to perform payments on the Internet whatever the bank permitting this service on their account. This selection is thus an open system of secure payments on the Internet.

For the buyer to be able to select his bank address code, the website (7) has first downloaded, from the operator site (1), the list of all the banks offering to use this secure payment method on the Internet. This table is managed by the operator because he performs this payment service on bank accounts. This table to be downloaded has, by country, by bank code, the URL addresses identifying on the servers of the different banks (3) the pages of transfer request to use to perform payments on the Internet with the operator (1) in charge of the present invention.

When the buyer (4) chooses to pay his orders by the present invention, he selects the address code (10) of his bank. This selection is preferably made by country and by bank. It is possible to consider the existence of several servers by bank or, conversely, a server for several banks. In all cases, to each bank address code always corresponds a URL address identifying a page of transfer request (12) necessary to the present invention and intended to be performed by a bank.

The buyer (4) is led to follow the different steps necessary to place the orders on the seller's website (7). Among these steps, he has chosen the present invention as the payment method and has selected the bank address code (10) in which is the bank account with which he wants to perform the payments. It is at the order confirmation (54) that the automatic creation (24, 25, 26) of the transfer request (12) will be triggered, from the bank address code entered in the order and the URL address corresponding to this bank address code and, so, that it will be displayed (27) on the buyer's (4) computer screen (16).

To be performed on the buyer's (4) bank account, the transfer request (12) must have the seller's (6) bank address (28), or payee's, and the one of the buyer (4) or the sold-to party, as well as the information (30) of the order and the payment notification to the seller (6). The save (47) of the transfer request does not constitute the order payment action but the preparation of the payment action. This is why it can be optional. If, for technical reasons out of the invention (a problem of connection on the Internet for example), the transfer request (12) cannot be recorded, the buyer (4) can return to the order that he has confirmed on the seller web site and trigger again the automatic display (27), on his computer (16), of the transfer request (12) from the service operator's (1) server (11a) of his bank (10).

The transfer request (12) must have the complete bank address (28) of the seller (6). So that a transfer request (12) can be performed on the buyer's (4) bank account whatever the seller's website (7), the bank address (28) in the payee's (6) bank (3) is transmitted as a parameter at the time of the call (24) of the transfer request (12) page. The complete bank address (28), which has to be transmitted from the seller's web site (7) to the server (11a) of the service operator (1) of the buyer's bank must have the country code, the SWIFT code, the routing code, the account number and the account key in order to be able to compose the International Bank Account Number (IBAN). With this condition, any transfer is performed to the destination of any seller's banks. The payee's bank address (28) represents an account to credit. By the present invention, this account is essentially credited by the payments of orders. But this bank address circulates on the Internet. Consequently, the banks offering this present invention and holding these accounts are in charge to authenticate (by the signature of the holder, for example) the debtor movements such as manual transfers.

The transfer request (12) has to have as well the buyer's bank address (9, 31). The sold-to party's (4) bank account is identified by an identification number called eAccount (31). This eAccount (31) is defined by the service operator (1) of the buyer's (4) bank (10). It corresponds to an account belonging to the buyer (4). Only the operator is able to carry out the correspondence between the buyer's (4) bank account number and his eAccount (31). If the eAccount (31) differs from the routing code and the buyer's (4) bank account number according to the management choice of the service operator (1), the buyer's (4) bank address entered on the transfer request (12) is complete in the form of the country code, the SWIFT code (9) and the eAccount (31) because the eAccount corresponds to the routing code and to the bank account number. If the eAccount (31) differs from the routing code and to the buyer's bank account number, the bank address of the buyer presents the quality to identify a bank account number (10) without unveiling the true bank account number. The bank account (9, 31) in this form is called eIBAN (e International Bank Account Number) or the IeBAN (International eBank Account Number). The present invention enables the existence and the use of an eAccount (31) in the same form in different banks. So, over the secure payment on the Internet (5), this complete address identifies a buyer and as well, more precisely, a payer bank account. This identification (32) is unique because a bank account is unique in a bank agency (i.e. the routing code). This identification (32) can then become the unique "customer" reference used by all the companies and institutions that the buyer pays from the account. For example, the buyer (4) will be able to be identified at the sellers' (6) by this identification (32). For the buyer (4), the point is to have a unique identification whatever the sellers and the institutions. For the sellers (6), the eAccount (31) enables to identify the buyers. On the other hand, in order to avoid having the buyer (6) enter manually his bank address (9, 31) on each transfer request or on each order, this address is preferably saved on his computer (16) by a software provided by the operator (1) and free remote downloadable. This software makes it possible to file several bank addresses, identifying the current one. Automatically, the creation of an order or a transfer request searches for (33) the current address used on the buyer's (4) computer (16). During the display (27) of the transfer request (12) or before, at the time of the order creation, it is possible to change the buyer's address (4) by selecting one of the other pre-recorded addresses or to enter it manually.

The transfer request (12), to be complete, has to have the payee's bank address (28, 32) and the buyer's (4) one as well as the information (30) of the order and the payment notification to the seller. A transfer request (12) is created to pay an order on the Internet (5). The buyer (4), eventually, brings up on screen and controls on his computer screen (16) the transfer request created automatically. So, the transfer request contains the information corresponding to the order. So that the transfer request should be recorded and then performed by the service operator (1) of the seller's bank, the information characteristic of the order are transmitted as parameters in addition to the payee's (4) and the sold-to party's (6) bank addresses. The information coming from the order once accepted by the buyer (4) is composed of the total amount, the currency and the order date. The order total amount and currency become the amount and the currency to transfer from the buyer's (4) account to the seller's one (6). When the transfer request (12) is confirmed (40), the seller (6) is notified (35) of the payment in order to end the order payment cycle. The payment notification (F) to the seller (6) by the service operator (1) of the buyer's (4) bank aims at warning the seller (6) of a next payment corresponding to an order on the account to credit he has transmitted. This notification has to include the order number, and if necessary, the billing number for the seller to be able to clear a notification to the corresponding order and consider it as billed. Consequently, in addition to the total amount and to the currency of the order detailed above, the order number, the seller's name and, if necessary, the bill number are as well transmitted as parameters to the transfer request display.

The present invention as a payment method starts by the creation of a transfer request (12) triggered at the order confirmation (54) by the buyer (4). This transfer request (12) can possibly be displayed on the service operator (1) server (11a) of the buyer's (4) bank because the latter has before selected the bank (10) address of the account from which he wants to perform the transfer. The transfer request (12) is a privileged check point for the operator (1). At the time of the transfer request (12) recording (36, 37, 38), the operator (1) can perform the checks that he has decided to make: check at the level of the eAccount (31), verification of its validity (bank account still active, frozen account because in deficit), transfer amount maximum limit, calculation of the cumulated amount for a period with limits of spending, maximum number and meter of transfers by period (etc.). He can as well warn the buyer (4) about additional costs in case, for example, of transfers to different countries from the one where the account with which he performs the payments is held. Moreover, the management of an identification, or identification code (39), (word chosen by the buyers) associated to the eAccounts (31) enables the operator (1) to prevent the uncertain use of numbers and, so, the sending of undesired confirmation requests. At this moment the operator (1) checks as well the sellers (6) and this way manages a credit control. The seller's accounts to credit are held in a bank offering this payment method. The sellers are identified by their account to credit. The operator (1), at the transfer request (12), recording can carry out checks and inform in interactive the buyer of the result of these checks. The transfer request recording (47) constitutes the first interactive relationship between the operator and the buyer.

The transfer request (12) recorded to perform the purchase payment on a seller's website (7) goes through the Internet network. But the Internet (5) is an open network, so unsecured. It is for this reason that the transfer request recording (47) does not constitute the order payment action but only the payment action preparation. The payment action for the buyer (4) is materialised from seeing that he confirms a confirmation request (40). The transfer confirmation (E) is performed in a technical environment away from the server (11a) and from the Internet network (5). The payment safety is made out of the Internet (5). The transfer confirmation (E) is preferentially achieved by a telecommunication server (11b). Whatever the techniques used to secure the payments, the principles and the procedures of this invention are not questionned again.

The buyer confirms an order on a seller's website (7), an automatic transfer request is recorded on the Internet server (11a) of the service operator (1) of the buyer's (4) bank. This transfer request (12) is out of the Internet (5) technical environment to be confirmed (40). The confirmation request (E) can be made by different channels (14) as long as they are out of the Internet (5). Let's carry on with the example which has been kept in the present invention. The telecommunication server (11b) of the service operator (1) of the buyer's (4) bank performs this transfer request by sending a confirmation request (E) on the buyer's (4) mobile phone (15). This mobile (15) phone number is known from the time when the buyer (4) registers at the operator's (1) of this payment service or at his bank (10). This mobile phone number (15) is assigned to the buyer's (4) eAccount (31). The telecommunication server (11b) of the service (1) operator displays in the form of a Short Message Sending (SMS) (41) a confirmation request including the seller's (6) name (29) as well as the information (30) concerning the order, and displays an action indication (42) (for example, a single action such as pressing a mobile (15) phone key) that the buyer (4) has to perform to confirm or cancel the confirmation request. With the transfer request (12) recording, the confirmation request constitutes the second interactive relationship between the operator (1) and the buyer (4). But, this time, in a secure environment, not on the Internet. This second interactive relationship in a secure network (14) enables a direct check on the buyer's (4) bank account (for example, the calculation of the account balance with the current transfer request) and a communication about the result of this check to the buyer. When the confirmation request (E) is confirmed (40), the telecommunication server (11b) of the service operator (1) of the buyer's (4) bank receives and files a confirmed transfer. This confirmed transfer constitutes towards the buyer (4) the secured payment action of a purchase on the Internet. It is conceivable to ask the buyer to enter his SIM code in order to confirm the request. The transfer is then allowed to be performed on the buyer's (4) bank account to pay the seller (6). At the time to perform the transfer confirmation, the mobile phone can however be engaged or out of the network (14). Consequently, in these cases, the buyer (4) accedes subsequently to his pending confirmation requests (43) on his mobile phone (15) as he can deliberately listen to his messages on his answering machine. As well, he must be able to consult the requests he has already confirmed. These requests should be archived with a predefined time limit.

The buyer (4) confirms an order on a seller's website (7), an automatic transfer request is recorded on the Internet server (11a) of the service operator (1) of the buyer's (4) bank. This transfer request has been created with the parameters passed from the seller's website (7). This transfer request is taken from the Internet (5) technical environment, and is then confirmed by the buyer (6) on his mobile phone (15). To end the order payment cycle and enable the release of the delivery of physical goods or the downloading of on line services before the payee's (6) bank account is credited, a payment notification (F) is sent to the seller (6). For that the seller (6) transmits his phone number (44) reserved for the notifications in addition to the information characteristic of the order. The notification is performed (35) by the sending, on a network (45) other than the Internet (5), of a message with the information characteristic of the order and/or the bill. This notification can be for example an SMS (Short Message Sending) sent by the service operator (1) of the buyer's (4) bank (10) to the seller (6). The network (45) enables the recognition of the calling phone numbers. The seller (6) processes this message as soon as he receives it and modifies the order status for it to be considered as billed. Subsequently, the seller (6) can control that all the transfers identified by notifications have been performed by the service operator (1) of the buyer's (4) bank (10) and that his account has been credited of the amount of the confirmed and billed orders. By receiving the notifications, the sellers (6) can verify their origin: the bank address code file that the seller (6) has downloaded from the operator (1) site shows one or several notification sending phone numbers (44).

Figure 3:
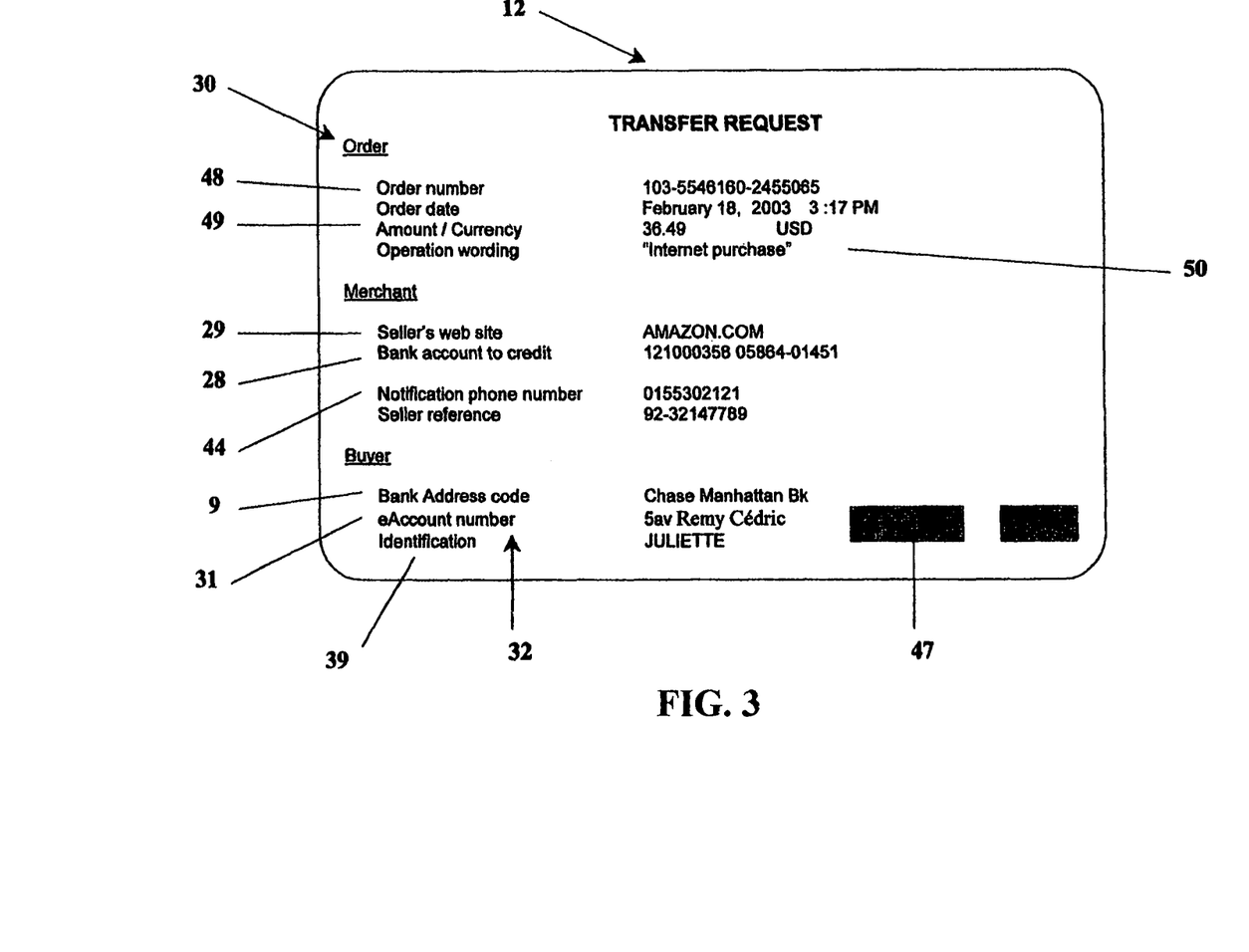
FIG. 3 is a schematic view showing the information elements and the fundamental objects contained in an electronic transfer request implemented by the procedure according to the invention.

FIG. 3 represents an example of the achievement of an automatic transfer request created on the server (11a) of the service operator (1) of the buyer's (4) bank. The buyer (4) has selected on the seller's website (7) the address code (9) of the bank account from which he wants to perform the transfer. The server (11a) of the service operator (1) of the buyer's (4) bank transmits (26) the page of transfer request (12) with the information necessary for a bank process, as well as an indication of action (36) (for example, an single action such as clicking on the mouse key) that the buyer (4) has to perform to save (47) or cancel the transfer request (12). The information necessary for the transfer request (12) to be achieved on the seller's bank account has to have the payee's addresses (28, 29) and the data (30) in relation to the confirmed order paid by the transfer. The payee's details include the name of the seller (29), the payee's complete bank address (28), it means the international bank account number (28) to credit, if necessary the transfer payee's bank name and, at last, the country code and the seller's phone number (44) for the payment notification (the display of this country code and of this phone number is not necessary). The data (30) in relation to the order are represented by the date and the time, the number (48) and/or the bill managed by the seller (6) and identifying in a unique way the order for the seller, the amount inclusive of tax and the currency (49) of the order and, at last, the operation wording (50) "Internet purchase". The payee's (6) details as well as the sold-to party's (4) ones and the data in relation to the order are transmitted as parameters at the creation (24) of the transfer request (12) on the server (11a) of the service operator (1) of the buyer's (4) bank. The details of the buyer (4) include the bank (10) address code (9) of the account from which he wants to perform the transfer and the eAccount (31) identifying the payer's bank account for the bank. To these details is added an identification (39) passed as well in parameter, which enables a first verification of the authenticity of the transfer request (12) for the service operator (1). The buyer's (4) details (9, 31) can be entered manually on each transfer request (12) if they have not been entered on the order and transmitted as parameters. However, the buyer (4), by downloading from the server (11a) of the service operator (1) a software of management of bank addresses (9, 31) for the present invention can save his complete addresses on his computer (16). At the creation of the order (19), the software on the computer (16) searches the entered addresses (9, 31). As a computer (16) can be used by several buyers to perform purchases on the Internet (5) and as the present invention enables the payment on the Internet without the circulation of private data, the software permits the management of several bank addresses (9, 31) of the payers (4) in the form of the eAccount (31). Only one of these records is considered to be main by a flag. It is this record which is considered by default as the buyer's (4) addresses at the creation of an order or a transfer request (12). The computer (16) nevertheless enables to select another record already entered in the software or to enter one manually on the transfer request.

Figure 4A:
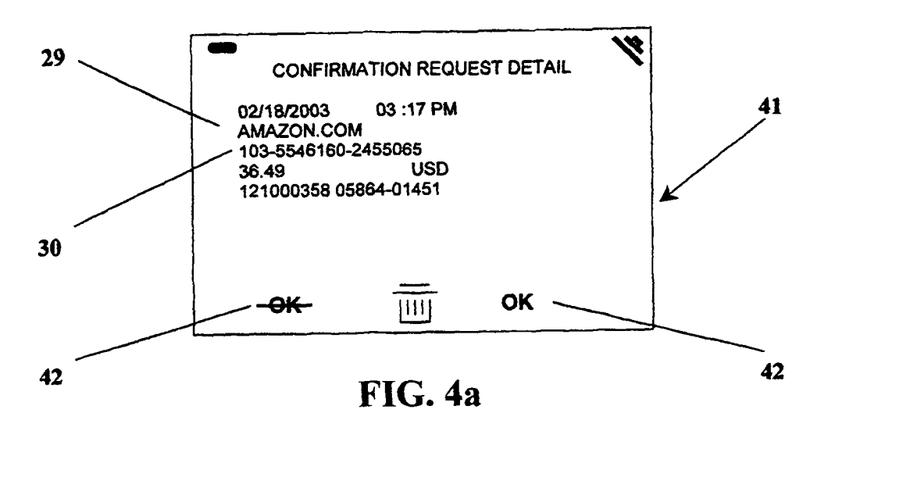
FIGS. 4a and 4b respectively show the information elements and the fundamental objects contained in the screen of the transaction confirmation request, and in the screen of the pending authentication requests, according to an advantageous use of the present invention.

FIG. 4a represents an example of the achievement of a confirmation request (E) automatically sent by the server (11b) of the service operator (1) of the buyer's (4) bank on his mobile phone (15). This request (E) is sent after the buyer (4) recorded a transfer request. The telecommunication server (11b) of the service operator (1) of the buyer's (4) bank displays the confirmation request (E) screen (41) with the information taken from the transfer request (12) and displays an action indication (42) (for example, an single action such as pressing a mobile key (15)) that the buyer (4) has to perform to accept or cancel the confirmation request, which is entirely filled with information. That is this acceptance by the buyer (4) which constitutes the payment action. The payment action is made off of the Internet (5). For this reason, the eAccount number (31) is not visible on the mobile phone (15). In that way, the mobile phone (15) alone cannot be used at the expense of its owner (4) to perform transfers and confirm them. By not knowing the eAccount number (31), it is not possible to create transfer requests (12) with only the mobile phone (15). This way, the payment safety is reinforced. The mobile phone (15) thus constitutes the payment instrument.

Figure 4B:
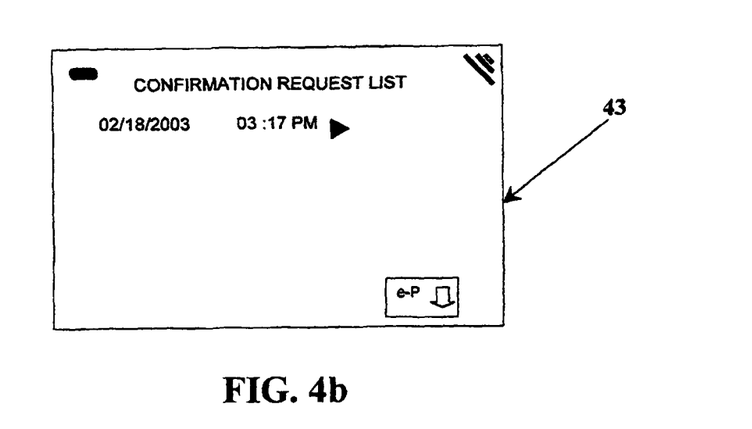

FIG. 4b represents an example of the achievement of a list of pending confirmation requests (43) on the server (11b) of the service operator (1) of the buyer's (4) bank. The procedure of the present invention consists of using the mobile phone (15) to confirm transfer requests (12) to perform payments. However, it is absolutely conceivable to consider that at the moment to confirm a transfer request the buyer's (4) mobile phone (15) is not connected to the network (14): it can be switched off, for example. In that case, the buyer (4) voluntarily accedes to the list of pending requests (43) as he can listen to his messages on his voicemail when he wants. From the list of pending requests (43), he displays the breakdown of the confirmation requests. As the breakdown of the confirmation requests uses the information entered during the creation of the transfer request (12), the buyer (4) confirms or cancels the pending requests. As he can accede to the pending requests, he can as well consult the list and the breakdown of the requests already confirmed.

As it stands to reason, the invention is not limited to the only above-mentioned technical specifications, given as examples; on the contrary, it embraces all the possible variants of achievements.

The invention claimed is:
1. A secure telematic payment method for controlling on-line transactions realized without a payment card, said method including the steps of:
 a) utilizing an unsecured open network using the TCP/IP protocol via the internet for interconnecting a first group of servers by means of which merchants perform commercial transactions, a second group of servers by means of which banks perform financial transactions, a group of clients by means of which customers perform commercial and financial transactions, and a third group of servers by means of which a service operator performs operations for validating said transactions,
 b) connecting said first group of servers to said third group of servers via a telephone network, c) providing a closed network using a connection mode and connecting said second group of servers to said third group of servers, d) using a mobile telephone network for connecting said third group of servers to said customers, and comprising the following steps:

a) a preliminary step (A) during which said service operator stores the personal data of said customers comprising at least one call number of the mobile telephone network as well as their financial information, including the bank account number of each of said customers, and sends them their identification data via completely secure means, said identification data comprising:

(1) a bank code comprising a first country identification field and a second bank identification field for each of the customers, (2) an electronic account identification number attached to said bank account number, and (3) an identification code differing for each of the customers, b) a first step (B) during which a buyer accesses, by means of one of the clients, a merchant site hosted on one of the servers of said first group and places an order for merchandise, c) a second step (c) during which said buyer sends said merchant said bank code comprising a first country identification field and a second bank identification field of the buyer via said open network, d) a third step (D) during which said merchant establishes a connection with said service operator via said open network, sending said service operator an identification string comprising the company name of and bank account information of said merchant, along with the first two aforementioned identification data of said buyer, namely, said bank code comprising a first country identification field and a second bank identification field, and a reference number of said order, e) a fourth step (E) during which said service operator establishes a connection via the mobile telephone network and transmits to said call number an authentication request composed of a short message containing said company name, said reference number and the indication of an action to be performed by said buyer on the keys of the buyer's mobile telephone, f) a fifth step (F) during which said service operator establishes a connection with said merchant via said telephone network and transmits a confirmation of the payment for said order after verifying said financial information, and g) a sixth step (G) during which said service operator establishes a connection with said second group of servers via the closed network and transmits a transaction order resulting in the payment of said merchant by said buyer, characterized in that said identification data sent during said second and third steps also include the identification code of said buyer, said verification during said fifth step (F) comprising the comparison of said bank code, said identification number and said bank account number, wherein:

a) said preliminary step (A) comprises the periodic downloading from said third group of servers by said first group of servers, via said open network, of mapping tables between said bank codes and the paths in said open network that identify, on the servers of the service operator for the buyers' banks, the payment request pages in hypertext markup language corresponding to each of said banks, b) said third step (D) breaks down into a first intermediate phase during which the merchant transmits via said unsecured open network said identification string to the buyer, said path corresponding to the bank code/address of said buyer determined by means of said tables and said reference number, and non-securely transmits back to said merchant the three identification data, a second intermediate phase during which said buyer accesses the corresponding page of his bank among said pages via said open network, and a third or final phase during which, in addition to the buyer's three identification data, said buyer also sends the operator via the said unsecured open network, by means of said page, said identification string of the merchant and said reference number.

2. Secure telematic payment method according to claim 1, characterized in that said identification string also includes at least one telephone number of said telephone network, and in that the notice of confirmation of the order is sent by said service operator to the merchant.

3. Secure telematic payment method according to claim 1, characterized in that the bank codes and the identification numbers are saved in the customers' client terminals.

4. Secure telematic payment method according to claim 1, characterized in that the action to be performed by the buyer in order to identify himself is the entry of the SIM code of his mobile telephone.

5. Secure telematic payment method according to claim 1, characterized in that said fourth step (E) comprises a preliminary phase during which said buyer establishes a connection with said operator if said buyer was not connected to said mobile telephone network, and receives a list comprising at least said request for authentication.

6. Secure telematic payment method according to claim 1, characterized in that the payment request pages are archived in said third group of servers of the service operator.

7. Secure telematic payment method according to claim 6, characterized in that:

a) said payment requests include a submit button and a third script compliant with the CGI software standard, the execution of which is triggered by said submit button and results in the transfer of the data of each payment request to said operator, b) each of the servers of said third group includes a fourth script compliant with the CGI software standard, the execution of which is triggered by the reception of the data of said payment request, and results in the storage and analysis of the data of said payment request, and the triggering of said fourth step (E).

8. Secure telematic payment method according to claim 1, characterized in that:

a) each of the servers of said first group has at least one page in hypertext markup language comprising:

a first form for the entry of the bank codes, including a first pull-down list offering the buyer a choice of countries and a second pull-down list offering a choice of banks, a second form for the entry of said identification number and the identification code, a first script compliant with the standard CGI (Common Gateway Interface) software standard, the execution of which is triggered by the confirmation of the order and results in the search in the mapping table for the bank code and the reading of the corresponding path, the reading of the data that compose the merchant's identification string, the formation of the reference number of said order, and the formation and transfer to the buyer of a data frame comprising said path, said identification string, said reference number and the three identification data of the buyer, a second script compliant with said standard CGI software whose execution is triggered by the reception of the data frame comprising said path, said merchant identification string, said reference number and the three identification data of the buyer sent by said merchant, and results in the redirection of the browser of said buyer to said path, the display on the screen of the client of said buyer of the payment request corresponding to said path among said payment requests, and the loading into the payment request of said merchant's identification string, said reference number of the order, and the three identification data of the buyer, and b) each of the servers of said first group has at least one file containing the data composing said identification string of the corresponding merchant.

9. Secure telematic payment method according to claim 8, characterized in that the page comprising the entry form also includes a fifth script compliant with the CGI software standard whose execution is triggered on opening and results in the search for, the reading, and the loading of the three identification data of the buyer into the form if said three identification data have been saved by said buyer on his client terminal.

\* \* \* \* \*